United States Patent
Suzuki

(10) Patent No.: US 7,201,196 B2
(45) Date of Patent: Apr. 10, 2007

(54) RUN-FLAT TIRE

(75) Inventor: Kazuya Suzuki, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 104 days.

(21) Appl. No.: 11/056,181

(22) Filed: Feb. 14, 2005

(65) Prior Publication Data
US 2005/0205187 A1 Sep. 22, 2005

(30) Foreign Application Priority Data
Mar. 16, 2004 (JP) .............................. 2004-074920

(51) Int. Cl.
*B60C 17/00* (2006.01)
*B60C 13/00* (2006.01)
*B60C 15/00* (2006.01)

(52) U.S. Cl. ....................... 152/517; 152/554; 152/555

(58) Field of Classification Search ................ 152/517, 152/543, 554, 555
See application file for complete search history.

(56) References Cited

U.S. PATENT DOCUMENTS

| | | | |
|---|---|---|---|
| 4,067,372 A | | 1/1978 | Masson |
| 4,263,955 A | * | 4/1981 | Ikeda .......................... 152/517 |
| 5,217,549 A | * | 6/1993 | Johnson ....................... 152/517 |
| 5,988,247 A | * | 11/1999 | Tanaka ........................ 152/517 |
| 6,269,857 B1 | | 8/2001 | Kanai et al. .................. 152/517 |
| 6,609,550 B2 | | 8/2003 | Suzuki ......................... 152/517 |
| 6,712,108 B1 | * | 3/2004 | Koeune et al. ............ 152/51 X |

FOREIGN PATENT DOCUMENTS

| | | | |
|---|---|---|---|
| DE | 198 46 854 A1 | | 4/2000 |
| EP | 0 507 184 A1 | | 10/1992 |
| JP | 05286319 A | * | 11/1993 |
| JP | 06171325 A | * | 6/1994 |
| JP | 08002220 A | * | 1/1996 |
| JP | 09058229 A | * | 3/1997 |
| JP | 11227424 A | * | 8/1999 |
| JP | 11245635 A | * | 9/1999 |
| JP | 2000-142042 A | | 5/2000 |
| JP | 2002211216 A | * | 7/2002 |
| JP | 2002301914 A | * | 10/2002 |
| WO | WO-00/46048 A1 | * | 8/2000 |

OTHER PUBLICATIONS

English machine translation of Japanese Patent Application 9-58229 A.*
English machine translation of Japanese Patent Application 11-245635 A.*
Mechanics of Pneumatic Tires, ed. Samuel Clark, U.S. Department of Transportation, Aug. 1981, pp. 146-151.*

* cited by examiner

*Primary Examiner*—Adrienne C. Johnstone
(74) *Attorney, Agent, or Firm*—Birch Stewart Kolasch & Birch, LLP

(57) ABSTRACT

A run-flat tire comprises a carcass comprising at least one carcass ply of cords extending between a pair of bead portions through a tread portion and sidewall portions, a sidewall reinforcing rubber layer disposed in each sidewall portion and tapering towards its radially inner end and outer end from a central portion to have a crescent shape in a meridian section of the tire, and a reinforcing cord layer disposed axially outside of each sidewall reinforcing rubber layer and comprising at least one reinforcing ply with cords inclined with respect to a radial direction of the tire.

12 Claims, 4 Drawing Sheets

RUN-FLAT TIRE

BACKGROUND OF THE INVENTION

1. Field of the Invention

The present invention relates to a run-flat tire that is capable of achieving weight saving without harming running performance in the presence of a puncture (hereinafter referred to as "run-flat performance").

2. Description of the Prior Art

Various kinds of run-flat tires have been suggested. These run-flat tires are possible to perform continuous running in a stable manner for a specified distance at relatively high speed even when a tire has become flat due to puncture or similar. In such types of run-flat tires, sidewall reinforcing rubber layers having substantially crescent sections are disposed at sidewall portions. In case of a tire puncture, the sidewall reinforcing rubber layers support much of the load of the tire.

In order to increase the distance of running after a puncture (hereinafter also referred to as "run-flat running"), the thickness of the sidewall reinforcing rubber layers is made to be quite large. However, such sidewall reinforcing rubber layers remarkably increase the tire weight. Accordingly, so-called unspring weight of the vehicle becomes large, which worsens the steering stability and fuel consumption performance.

SUMMARY OF THE INVENTION

It is one object of the present invention to achieve weight saving without harming run-flat performance in a run-flat tire.

According to the present invention, a run-flat tire comprises a carcass comprising at least one carcass ply of cords extending between a pair of bead portions through a tread portion and sidewall portions, a sidewall reinforcing rubber layer disposed in each sidewall portion and tapering towards its radially inner end and outer end from a central portion to have a crescent shape in a meridian section of the tire, and a reinforcing cord layer disposed axially outside of each sidewall reinforcing rubber layer and comprising at least one reinforcing ply with cords inclined in a radial direction of the tire.

DESCRIPTION OF THE PREFERRED EMBODIMENTS

An embodiment of the present invention will now be described in detail in conjunction with the accompanying drawings.

Figure 1:
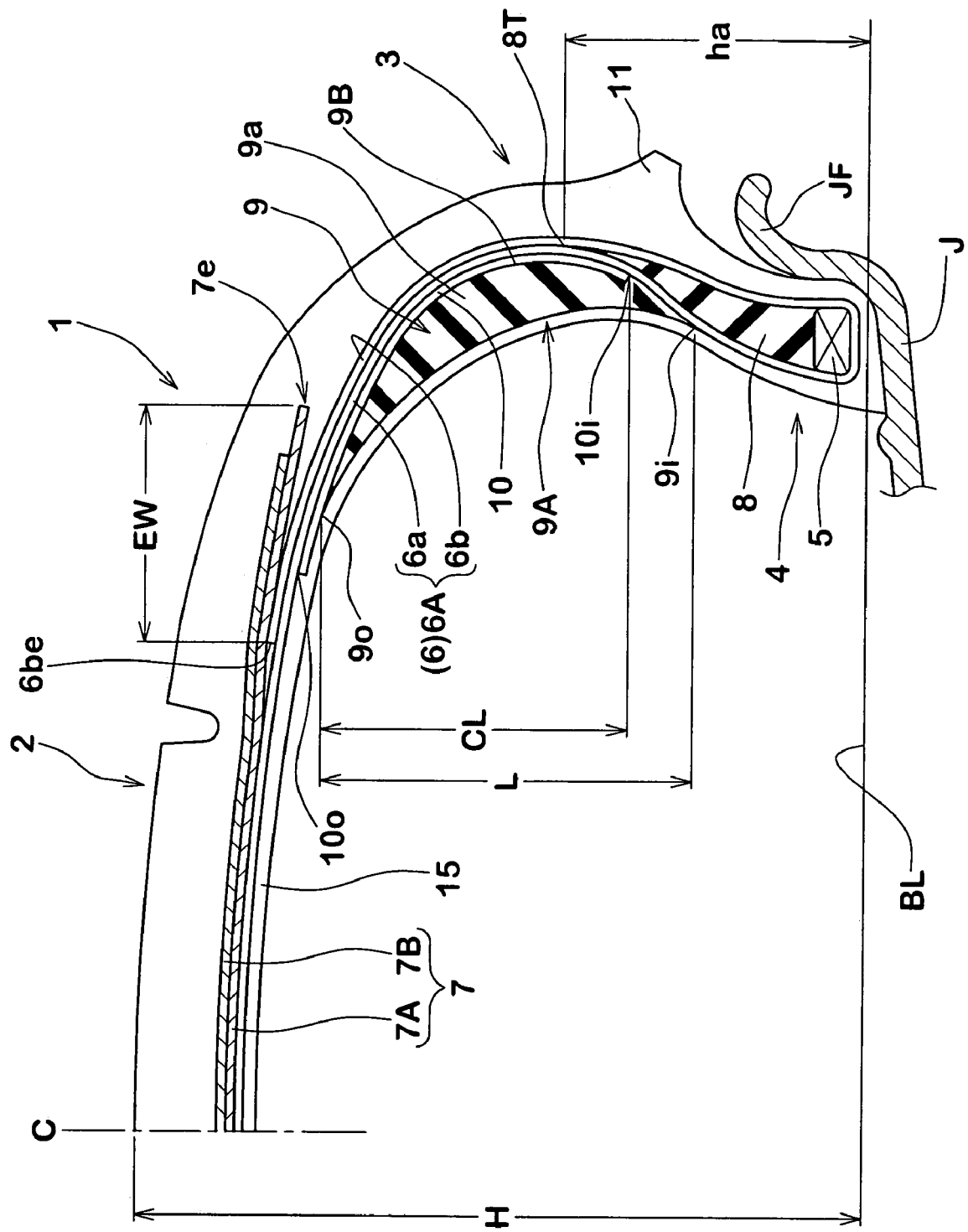
FIG. 1 is a sectional view of a run-flat tire showing one embodiment of the present invention.

In FIG. 1, a run-flat tire 1 for passenger car in accordance with present invention comprises: a tread portion 2; a pair of side wall portions 3; a pair of bead portions 4 with a bead core 5 therein; a carcass 6 comprising at least one carcass pry 6A of cords which extend between the bead portions 4 through the tread portion 2 and sidewall portions 3; a belt 7 disposed radially outside the carcass in the tread portion 2; a sidewall reinforcing rubber layer 9 disposed in each sidewall portion 3; and an inner liner layer 15 made of a gas-impermeable rubber which is disposed along the inner surface of the tire facing the tire cavity.

In this embodiment, the carcass 6 comprises only one ply 6A of cords arranged radially at an angle of 75 to 90 degrees with respect to the tire equator C. For the carcass cords, organic fiber cords, e.g. nylon, polyester, rayon, aramid and the like and steel cords may be used.

The carcass ply 6A of cords extends between the bead portions 4 through the tread portion 2 and sidewall portions 3, and turned up around the bead cores 5 from the axially inside to the axially outside of the tire so as to form a pair of turnup portions 6b and a main portion 6a therebetween.

In this embodiment, each turnup portion 6b extends through the sidewall portion 3 to the tread portion 2 and terminates between the main portion 6a and the belt 7. Such a carcass ply 6A may effectively reinforce the sidewall portions 3 with a small amount of plies. An outer ends 6be of the turnup portions 6b that exhibit low durability are remote from the sidewall portions 3 that largely deflect when performing run-flat running and are located between the belt layer 7 and the main portion 6a of the carcass ply at which the distortion is small.

Accordingly, such a run-flat tire 1 presents damages such as separation originating at the outer ends 6be to improve the durability. In this viewpoint, an overlapping length EW between the turnup portions 6b and the belt 7 in the tire axial direction is desirably not less than 5 mm, and preferably not less than 10 mm, and more preferably in a range of from 15 to 25 mm. In this respect, the carcass ply 6A may also be comprised of a plurality of plies.

Here, dimensions of respective parts of the tire are values obtained in a normal condition if not otherwise specified. In this respect, a "normal condition" is a condition in which the tire is mounted on a standard rim J and inflated to a standard pressure and loaded with no tire load. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. In case of passenger car tires, however, 180 kPa is used as the standard pressure.

Each bead portion 4 is provided between the main portion 6a and the turnup portion 6b with a rubber bead apex 8 extending and tapering radially outwardly from the bead core 5. The bead apex 8 is formed of hard rubber having a JIS-A hardness of, for instance, 65 to 95 degrees and more preferably of 70 to 95 degrees. With this arrangement, it is possible to improve the bending rigidity of the bead portions 4 and to reduce the longitudinal deflection of the tire 1.

While a height ha of the bead apex 8 from a bead base line BL to an radially outer end 8T thereof is not particularly limited, when it is too small, the durability during run-flat running tends to be worsened while when it is too large, it tends to cause excess increases in the tire weight and remarkable worsening of the riding comfort. In this viewpoint, the height ha is desirably 10 to 45% of a tire height H and more preferably 25 to 40% thereof.

The belt 7 comprises at least two cross plies of rubberized parallel belt cords which are laid at an angle of from 10 to 35 degrees with respect to the tire equator C. In this example, the belt 7 is composed of a radially outer ply 7B and a radially inner ply 7A having belt edges 7e. For the belt cords, steel cords, and high modulus organic fiber cords such as aramid, rayon and the like can be used.

Figure 3:
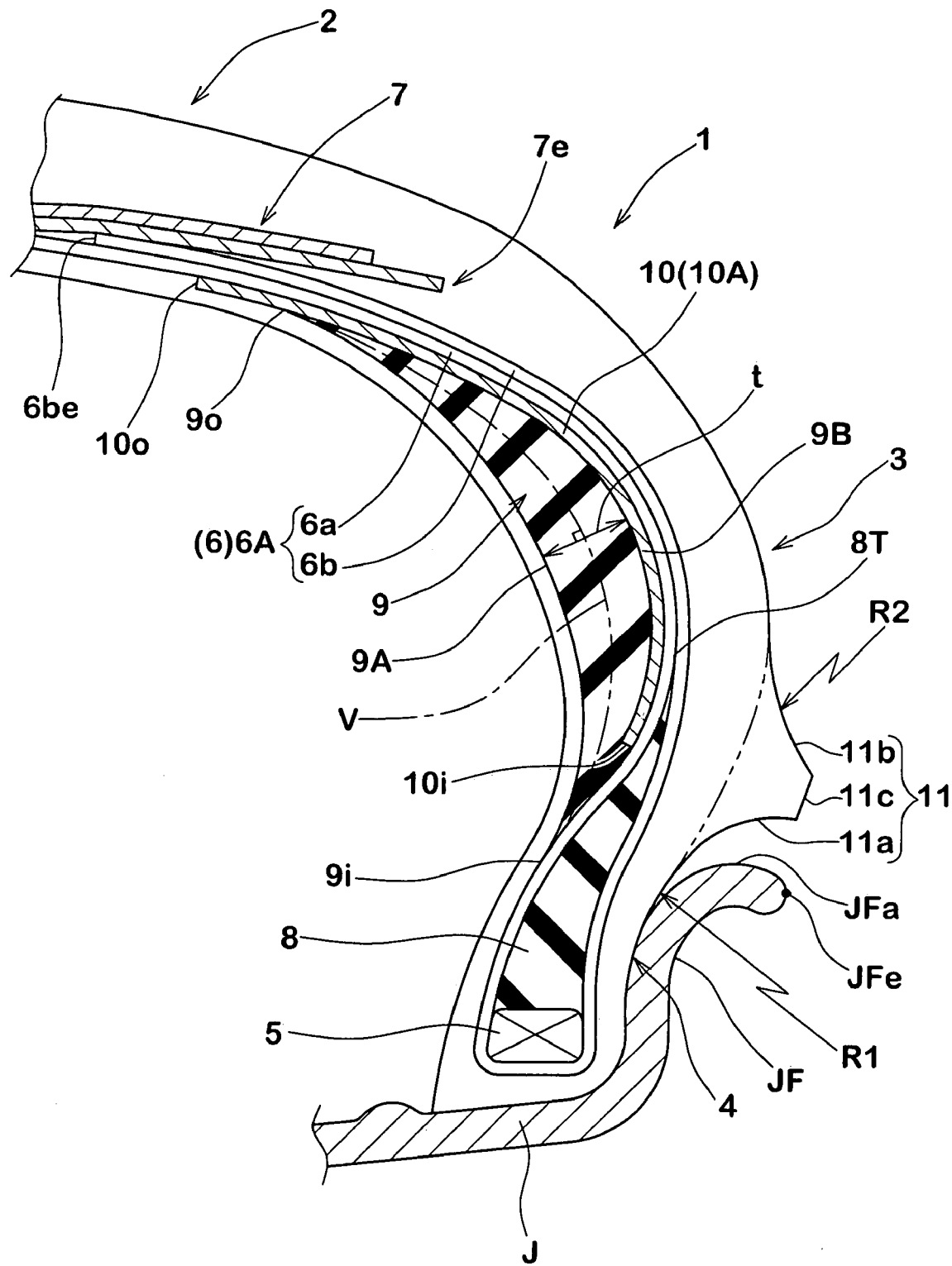
FIG. 3 is a partial sectional view showing a bead portion of FIG. 1 in enlarged form.

The bead portions 4 are further provided with rim protectors 11 that project to cover outside of rim flanges JF of the rim J in the tire radial direction and that continuously extend in the tire circumferential direction. As shown in FIG. 3, each rim protector 11 is an elevation partitioned into a projecting surface portion 11c that mostly projects outside in the tire axial direction in a tire section including the tire axis, an inner inclined portion 11a that continues to an radially inner edge of the projecting surface portion 11c and that smoothly extends inside in the tire radial direction to continue to the bead portion 4, and an outer inclined portion 11b that continues to an radially outer edge of the projecting surface portion 11c and that extends outside in the tire radial direction to smoothly continue to the sidewall portions 3.

The projecting surface portion 11c desirably projects further outside in the tire axial direction than the axially outer end JFa of the rim flange JF. With this arrangement, it is possible to protect the rim flange JF from curbs or similar when performing normal running.

Figure 2:
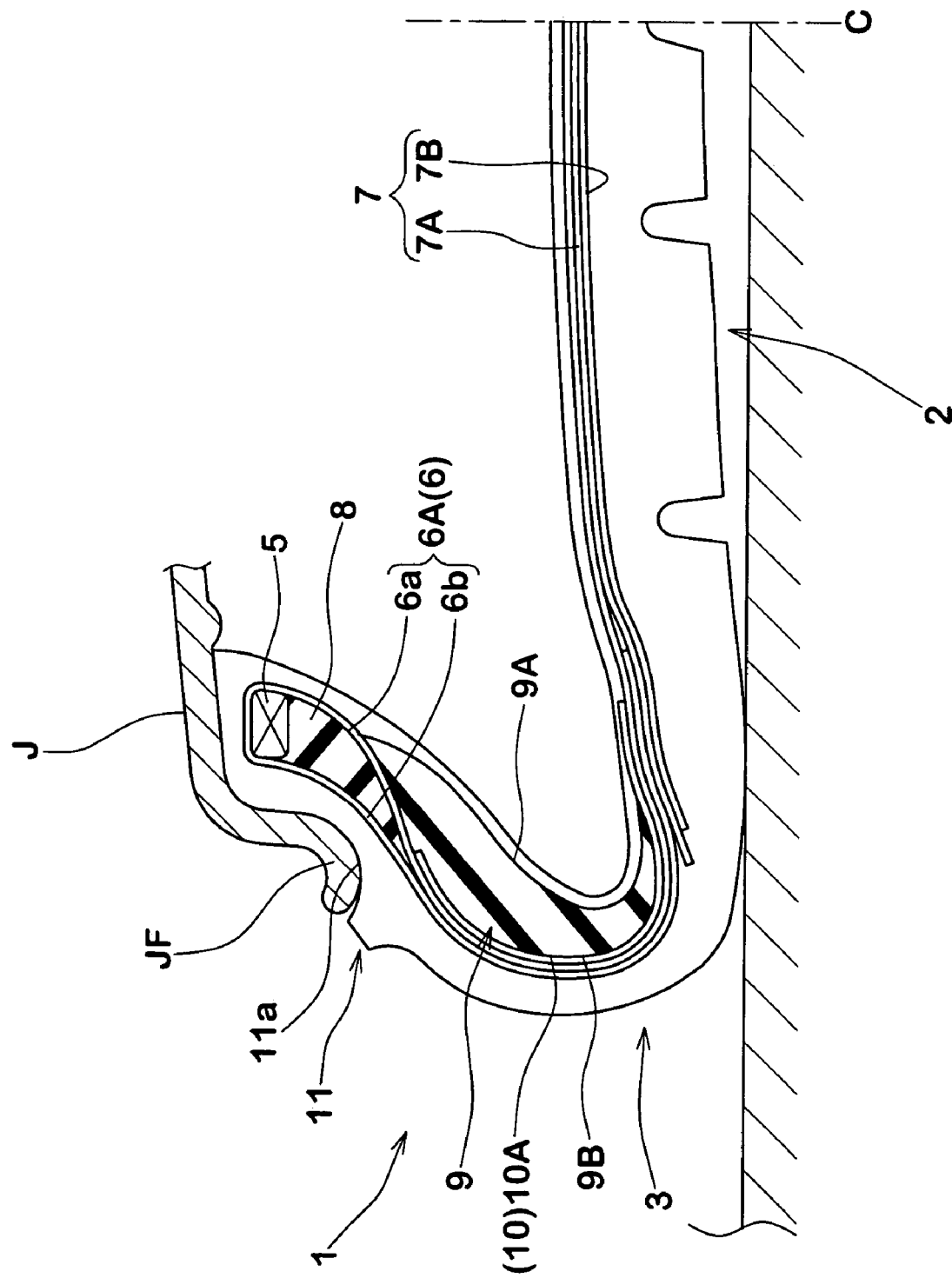
FIG. 2 is a sectional view of a run-flat condition thereof.

The inner inclined portion 11a is formed of a smooth concaved surface including an arc portion with its center being located further outside in the tire axial direction than the bead portion 4 and formed to have a radius of curvature R1 that is larger than a radius of curvature of an outer peripheral surface JFa of the rim flange JF. As shown in FIG. 2, the inner inclined portion 11a can be deformed to lean over onto the rim flange JF without resistance when performing run-flat running and serves to ease shearing force to the carcass 6.

The outer inclined surface portion 11b is also formed smoothly to include an arc portion having a radius of curvature R2 with its center being located outwardly of the tire.

As shown in FIG. 3, the inner inclined portion 11a of the rim protector 11 is hardly in contact with the outer peripheral surface JFa of the rim flange JF in the standard condition. However, when performing run-flat running as shown in FIG. 2, the inner inclined portion 11a strongly contacts with the outer peripheral surface JFa of the rim flange JF over a large area so as to cover the same. With this arrangement, it is possible to effectively restrict the amount of longitudinal deflection of the tire when performing run-flat running so as to improve the durability. Accompanying this, it also serves, for instance, to reduce the thickness of the sidewall reinforcing rubber layers 9 and to achieve further downsizing and weight saving.

The sidewall reinforcing rubber layer 9 is disposed the axially inside of the carcass 6 in each sidewall portion 3. The sidewall reinforcing rubber layer 9 tapers towards its radially inner end 9i and outer end 9o from a central portion 9a to have a substantially crescent shape in a meridian section.

The inner end 9i is preferably positioned radially inside than the outer end 8T of the bead apex 8 and radially outside than the bead core 5.

The outer end 9o extends radially outwardly and preferably terminates at a position that is further axially inside than the belt edge 7e. Such sidewall reinforcing rubber layer 9 can reinforce the rigidity of the sidewall portion 3 over substantially the entire region thereof so as to restrict the longitudinal deflection when performing run-flat running.

While a radial length L (as shown in FIG. 1) between the inner end 9i and the outer end 9o of the sidewall reinforcing rubber layers 9 is not particularly limited, when the length L is too small, it will become difficult to obtain a smooth curved condition of the sidewall portions 3 as shown in FIG. 2 when performing run-flat running. On the other hand, when the length L is too large, the riding comfort at the time of performing normal running or the performance of rim assembly tends to be worsened. In this viewpoint, it is preferable to set the length L to preferably in a range of from 35 to 70% and more preferably in a range of from 40 to 65% the tire height H.

The sidewall reinforcing rubber layer 9 of the present embodiment is formed of a single rubber material and it is desirably a rubber composition having a JIS-A hardness of in a range of from 65 to 90 degrees and more preferably 70 to 85 degrees and most preferably 74 to 80 degrees. When the JIS-A hardness of the sidewall reinforcing rubber layer 9 is less than 65 degrees, no sufficient bending rigidity can be applied to the sidewall portions 3 and compression distortion will be focused at axially inner portions of the sidewall reinforcing rubber layers 9 when performing run-flat running such that thermal destruction is apt to occur at an early stage. On the other hand, when the JIS-A hardness of the sidewall reinforcing rubber layer 9 exceeds 90 degrees, the riding comfort tends to be remarkably degraded at the time of performing normal running. A rubber polymer used for the sidewall reinforcing rubber layer 9 is preferably diene based rubber, and more particularly one or two kinds of natural rubber, isoprene rubber, styrene butadiene rubber, butadiene rubber, chloroprene rubber, and acrylonitrile butadiene rubber are desirable.

Each reinforcing cord layer 10 is disposed axially outside the sidewall reinforcing rubber layer 9. The reinforcing cord layer 10 of the present embodiment is disposed between the sidewall reinforcing rubber layer 9 and the main portion 6a of the carcass ply 6A and is in contact with an outer surface 9B of the sidewall reinforcing rubber layer 9.

Figure 4A:
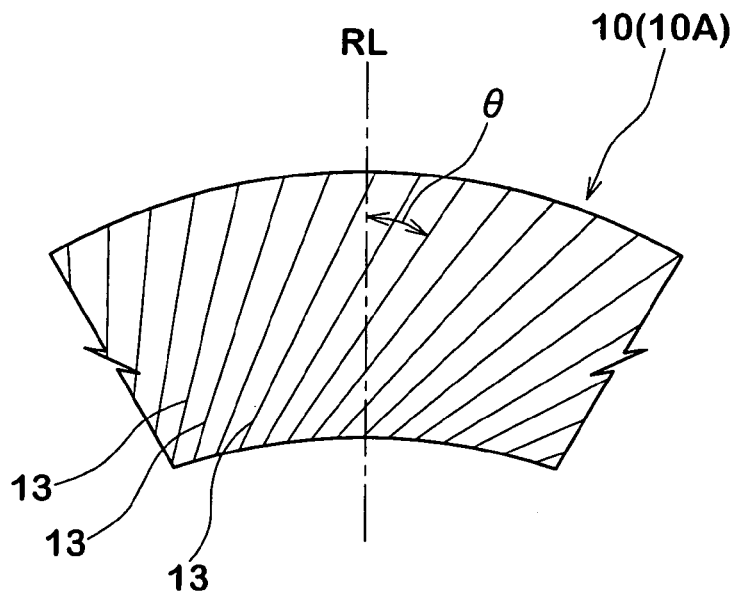
FIGS. 4(A) and 4(B) are partial side views of a reinforcing cord layers.
Figure 4B:
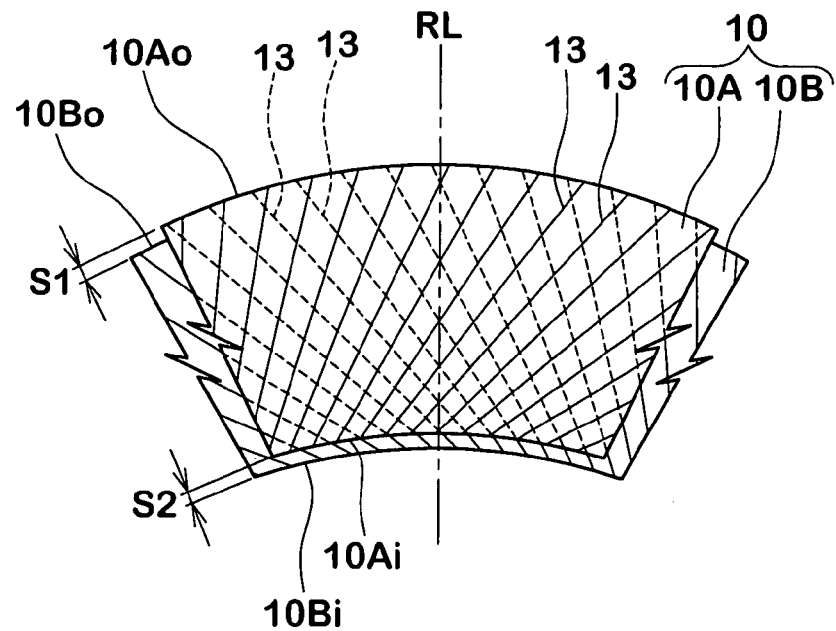

The reinforcing layer 10 comprises at least one reinforcing ply 10A with cords 13 as shown in FIGS. 4(A) and 4(B) being inclined in the radial direction. In the present descriptions, the term "radial direction" indicates a direction of cut sectional of the tire meridian including a tire rotational axis, and inclining in the radial direction indicates that cords 13 of the reinforcing ply 10A are not parallel with respect to the radial direction. In this respect, as mentioned above, the carcass ply 6A of the present embodiment is arranged in that carcass cords are aligned at a small angle of 0 to 15 degrees with respect to the radial direction.

As shown in FIG. 2, while primarily compression stress acts on the axially inner surface 9A of the sidewall reinforcing rubber layers 9 and primarily tensile stress to the axially outer surface 9B when performing run-flat running. The cords 13 of the reinforcing cord layer 10 disposed in the outer surface 9B of the sidewall reinforcing rubber layers 9 exhibit a larger tensile elastic modulus when compared to rubber. Accordingly, the tensile strength of the outer surface 9B or the periphery thereof is effectively improved in an integrated manner with the outer surface 9B accompanying the bending deformation of the sidewall reinforcing rubber layers 9. As a result, the bending deformation of the sidewall reinforcing rubber layers 9 is reduced, and the longitudinal deflection of the tire is reduced. Thus, the distortion of the sidewall portions 3 is reduced, heat generation is eased, and the continuous running distance is increased. By the provision of the reinforcing cord layer 10, equivalent or even better run-flat performance can be improved even upon reducing the thickness of the sidewall reinforcing rubber layers 9. Accordingly, it is possible to achieve weight saving of the tire weight without harming run-flat performance.

Here, cords 13 of the reinforcing ply 10A are preferably organic fiber cords having a small specific gravity and exhibiting favorably adhesiveness with rubber, and particularly aramid, nylon, polyester or rayon is preferably employed. More preferably, cords having a larger tensile elastic modulus than that of the carcass cords (for instance, organic fiber cords such as aramid) are desirably employed.

FIG. 4(A) shows a partial side view in which the cord reinforcing layer 10 is seen from outside in the tire axial direction. While it is suffice if the cords 13 of the reinforcing ply 10A are inclined with respect to a reference line RL in the radial direction, it is desirable that the cords 13 are inclined at an angle θ in a range of from 35 to 65 degrees, and more preferably from 45 to 55 degrees. When the angle θ is smaller than 35 degrees, the cords 13 will become closer to parallel with respect to the cords of the carcass ply 6A so that the riding comfort tends to be worsened. On the other hand, when the angle θ becomes larger than 65 degrees, worsening of run-flat performance or loosing of the carcass cords at the time of forming is apt to occur. In this respect, the angle Θ is measured on the basis of a cord that extends through substantially a central position in the tire radial direction of the reference line RL.

While the reinforcing cord layer 10 is formed of a single reinforcing ply 10A in the embodiment as illustrated in FIGS. 1 to 4(A), it is possible to comprise the same of a plurality of, for instance, two to three (in this example, two) reinforcing plies 10A, 10B as shown in FIG. 4(B). In this case, the plies 10A, 10B are desirably overlapped in a direction in which the respective cords 13 intersect with each other. The reinforcing cord layer 10 comprised of a plurality of reinforcing plies includes cords 13 that intersect in a pantograph-like manner and exhibits an even larger rigidity with respect to load acting in the radial direction when performing run-flat running, and it is possible to further reduce the longitudinal deflection of the tire.

The plurality of reinforcing plies 10A, 10B as shown in FIG. 4(B) have radially inner ends 10Ai, 10Bi and radially outer ends 10Ao and 10Bo. The radially inner ends 10Ai, 10Bi are preferably shifted from each other in the radial direction of the tire. In the same way, the radially outer ends 10Ao, 10Bo are preferably shifted from each other in the radial direction of the tire. This arrangement serves to disperse distortion that tends to be focused at end portions of the reinforcing cord layer 10 and to improve the durability.

A radial length S1 between radially outer end 10Ao and 10Bo and/or a radial length S2 between radially inner end 10Ai and 10Bi measured along the plies are desirably in a range of from 3 to 10 mm, more preferably in a range of from 5 to 10 mm.

When at least a part of the reinforcing cord layer 10 is in contact with the outer surface 9B of the sidewall reinforcing rubber layers 9, a layout region thereof in the tire radial direction can be freely set while when the contact region is too small, it may be that no sufficient effects can be achieved. Accordingly, a radial length CL (as shown in FIG. 1) of the contact region between the sidewall reinforcing rubber layers 9 and the reinforcing cord layer 10 is desirably, for instance, not less than 30% of the radial length L of the sidewall reinforcing rubber layers 9, more preferably not less than 40% and further preferably not less than 60% thereof. In this respect, it goes without saying that the radial length CL of the contact region may be 100% of the radial length L of the sidewall reinforcing rubber layers 9.

While positions of the radially outer end 10o and the radially inner end 10i of the reinforcing cord layer 10 can be freely determined, it is desirable to dispose them at positions at which distortions are small. More particularly, at the radially outer end 10o and the radially inner end 10i of the reinforcing cord layer 10, a rigidity difference tends to be generated between the same and the peripheral rubber members or the like. Accordingly, when these portions are located at regions that are exposed to large distortion, loosing of rubber and similar tends to occur at the outer end 10o or the inner end 10i. In this viewpoint, the outer end 10o of the reinforcing cord layer 10 is preferably positioned approximately in the middle of the outer end 9o of the sidewall reinforcing rubber layer 9 and the outer end 6be of the turnup portion of the carcass ply 6A. Such a position is covered by the strong belt 7 so that it is hardly affected through distortion during running. Accordingly, damages of the outer end 10o of the reinforcing cord layer 10 can be effectively prevented also when performing run-flat running. Moreover, since the outer ends 10o, 6be and 9o are shifted in position in the tire axial direction so that these ends are not overlapped each other, no excessively large rigidity differences are generated. Accordingly, focusing of distortion to these portions can also be prevented.

Similarly, the radially inner end 10i of the reinforcing cord layer 10 is desirably positioned between the radially inner end 9i of the sidewall reinforcing rubber layer 9 and the outer end 8T of the bead apex 8. In the present embodiment, it is positioned approximately in the middle of the inner end 9i of the sidewall reinforcing rubber layer 9 and the outer end 8T of the bead apex 8. At such a position, the hard bead apex 8 is disposed outside thereof in the tire axial direction while the sidewall reinforcing rubber layer 9 is disposed inside thereof so that it is hardly affected through distortion during running. Accordingly, damages of the inner end 10i of the reinforcing cord layer 10 can be effectively prevented. Moreover, since respective ends 10i, 9i and 8T are shifted in position in the tire radial direction so that these ends are not overlapped each other, no excessively large rigidity differences are generated. Accordingly, focusing of distortion to this portion can also be prevented.

By the provision of the reinforcing cord layer 10, the maximum thickness t of the sidewall reinforcing rubber layers 9 can be further reduced. For instance, as shown in FIG. 3 in enlarged view, the maximum thickness t is set to preferably in a range of from 2 to 10 mm, and more preferably in a range of from 4 to 8 mm, and further preferably in a range of from 4 to 7 mm in case of the tire for a passenger car of the present embodiment, whereby it is possible to satisfy both run-flat durability and weight saving in a well-balanced manner. The maximum thickness t is a largest thickness among thicknesses measured in an orthogonal direction with respect to a central line V of the thickness of the sidewall reinforcing rubber layers 9. It is even more effective to provide at least a part of the reinforcing cord layer 10 at least on the outer surface of the maximum thickness t of the sidewall reinforcing rubber layers 9.

As explained so far, the run-flat tire 1 according to the present embodiment is capable of achieving weight saving of the tire without harming run-flat running performance by the provision of the reinforcing cord layer 10 on the outer surface 9B of the sidewall reinforcing rubber layers 9. While the above embodiment has been explained on the basis of an example in which the tire is for use in a passenger car, it goes without saying that the present invention is not limited to such an embodiment but may be applied to tires of other categories.

EXAMPLES

For confirming effects of the present invention, several types of run-flat tires having a size of "245/40R18" were manufactured on trial according to specifications of Table 1 to evaluate run-flat durability performance, tire weight and riding comfort. As for the tires of the example, reinforcing plies in which aramid cords were aligned as the reinforcing cord layer were employed. Parameters other than those as indicated in Table 1 are identical.

The test methods were as follows.

Run-Flat Durability Performance:

Respective sample tires were made to run on a drum tester at a velocity of 90 km/h and under a longitudinal load of 5.74 kN upon being assembled to a standard rim (18×8JJ) with the bulb core being eliminated and in a condition of zero internal pressure, and running times until tires burst were measured. The results are indicated by indices with that of the Comparative Example 1 being 100. The larger the value is, the more favorable it is.

Tire Weight:

Weights of each tire were measured and indicated by indices with that of the Comparative Example 1 being 100. The smaller the value is, the lighter it is.

Riding Comfort:

Respective sample tires assembled to a rim of 18×8JJ and filled with an internal pressure of 230 kPa were mounted to four wheels of a FR vehicle having an engine displacement of 3,000 cm$^3$, and sensory evaluations were performed in a state where one driver gets in the car, with respect to cragginess, knocking up and damping on stepped roads of dry asphalt road surfaces, Belgian roads (stone-paved road surfaces) or Bitzman roads (streets paved with pebbles) or similar and indicated by indices with that of the Comparative Example 1 being 100. The larger the value is, the more favorable it is. Test results are illustrated in Table 1.

TABLE 1

| | | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|---|
| Sidewall reinforcing rubber layer | JIS-A hardness [deg] | 78 | 65 | 95 | 78 | 78 | 78 | 78 | 78 | 78 | 78 |
| | Maximum thickness t [mm] | 8.0 | 8.0 | 8.0 | | | | 4.0 | | | |
| Reinforcing cord layer | Number of reinforcing plies | 0 | 0 | 0 | | | | 1 | | | |
| | Cord angle θ [deg] | — | — | — | 35 | 40 | 45 | 50 | 55 | 60 | 65 |
| Test results | Run-flat durability performance [index] | 100 | 80 | 105 | | | | 90 | | | |
| | Tire weight [index] | 100 | 100 | 100 | 100 | 100 | 100 | 100 | 100 | 100 | 100 |
| | Riding comfort [index] | 100 | 110 | 85 | 90 | 95 | 100 | 100 | 100 | 100 | 100 |

| | | Example 8 | Example 9 | Example 10 | Example 11 | Example 12 | Example 13 | Example 14 | Example 15 | Example 16 | Example 17 |
|---|---|---|---|---|---|---|---|---|---|---|---|
| Sidewall reinforcing rubber layer | JIS-A hardness [deg] | | | | | 78 | | | | | |
| | Maximum thickness t [mm] | | | | 4.0 | | | | | 4.0 | |
| Reinforcing cord layer | Number of reinforcing plies | | | | 2 | | | | | 3 | |
| | Cord angle θ [deg] | 35 | 40 | 45 | 50 | 55 | 60 | 65 | 35 | 50 | 65 |
| Test results | Run-flat durability performance [index] | 105 | 105 | 105 | 105 | 105 | 105 | 105 | 108 | 108 | 108 |
| | Tire weight [index] | | | | 95 | | | | | 90 | |

TABLE 1-continued

| | | | | | | | | | | |
|---|---|---|---|---|---|---|---|---|---|---|
| Riding comfort [index] | 85 | 90 | 90 | 90 | 90 | 90 | 90 | 85 | 85 | 85 |

It can be confirmed from the test results that the tires of the present examples exhibit equivalent or improved run-flat performance while significantly achieving weight saving when compared to the Comparative Example 1.

What is claimed is:

1. A run-flat tire comprising
a carcass comprising at least one carcass ply of cords comprising a main portion extending between a pair of bead portions through a tread portion and sidewall portions and a pair of turnup portions each turned up around a bead core in the bead portion from the axially inside to the outside of the tire,
a belt being provided outside of the carcass in the tread portion,
a sidewall reinforcing rubber layer disposed axially inside the main portion of the carcass ply in each sidewall portion and tapering towards its radially inner end and outer end from a central portion to have a crescent shape in meridian section of the tire, and
a reinforcing cord layer disposed between each sidewall reinforcing rubber layer and the main portion of the carcass ply in contact with both the main portion and the outer surface of the sidewall reinforcing rubber layer, the reinforcing cord layer comprising at least two reinforcing plies each with cords inclined with respect to a radial direction of the tire and overlapped in directions in which the cords intersect with each other, wherein
each turnup portion extends to the tread portion and terminates between the main portion and the belt, and
each reinforcing cord layer has a radially outer end located between a radially outer end of the sidewall reinforcing rubber layer and a radially outer end of the turnup portion.

2. The run-flat tire according to claim 1, wherein each reinforcing ply includes organic fiber cords inclined at angle in a range of 35 to 65° with respect to the radial direction of the tire.

3. The run-flat tire according to claim 1, wherein
the carcass comprises at least one carcass ply of cords aligned at an angle of 0 to 15° with respect to the radial direction.

4. The run-flat tire according to claim 3, wherein
the reinforcing cord layer comprises two reinforcing plies having radially inner ends,
the radially inner ends are shifted from each other in the radial direction of the tire, and
a radial length between the radially inner ends measured along the reinforcing plies is in a range of from 3 to 10 mm.

5. The rum-flat tire according to claim 3 or 4, wherein
the reinforcing cord layer comprises two reinforcing plies having radially outer ends,
the radially outer ends are shifted from each other in the radial direction of the tire, and
a radial length between the radially outer ends measured along the reinforcing plies is in a range of from 3 to 10 mm.

6. The run-flat tire according to claim 1, wherein
the sidewall reinforcing rubber layer has a maximum thickness in a range of from 2 to 10 mm, and
at least a part of the reinforcing cord layer contacts an outer surface of the maximum thickness position of the sidewall reinforcing rubber layer.

7. The run-flat tire according to claim 1, wherein an overlapping length between the turnup portion and the belt in the tire axial direction is in a range of from 5 to 25 mm.

8. The run-flat tire according to claim 1, wherein the reinforcing cord ply has a organic fiber cord having a larger tensile elastic modulus than the cords of the carcass ply.

9. The run-flat tire according to claim 1, wherein each reinforcing ply includes organic fiber cords inclined at angle in a range of 35 to 55° with respect to the radial direction of the tire.

10. The run-flat tire according to claim 1, wherein
the tire comprises a rubber bead apex extending and tapering radially outwardly from a bead core disposed in each bead portion, wherein
the reinforcing cord layer comprises a radially inner end located between a radially inner end of the sidewall reinforcing rubber layer and a radially outer end of the rubber bead apex.

11. The run-flat tire according to claim 1, wherein an inner surface of the sidewall reinforcing rubber layer is covered with an inner liner layer made of gas-impermeable rubber.

12. A run-flat tire comprising
a carcass comprising at least one carcass ply of cords comprising a main portion extending between a pair of bead portions through a tread portion and sidewall portions,
a sidewall reinforcing rubber layer disposed axially inside the main, portion of the carcass ply in each sidewall portion and tapering towards its radially inner end and outer end from a central portion to have a crescent shape in a meridian section of the tire,
a reinforcing cord layer disposed between each sidewall reinforcing rubber layer and the main portion of the carcass ply in contact with both the main portion and the outer surface of the sidewall reinforcing rubber layer, the reinforcing cord layer comprising at least two reinforcing plies each with cords inclined with respect to a radial direction of the tire and overlapped in directions in which the cords intersect with each other, and
a rubber head apex extending and tapering radially outwardy from a bead core disposed in each bead portion, wherein
each reinforcing cord layer has a radially inner end located between a radially inner end of the sidewall reinforcing rubber layer and a radially outer end of the rubber bead apex.

* * * * *